United States Patent
Mantell et al.

(10) Patent No.: US 10,717,298 B1
(45) Date of Patent: Jul. 21, 2020

(54) SYSTEM AND METHOD FOR IMPROVING CHARACTER EDGE FORMATION ON NON-ABSORBING MEDIA

(71) Applicant: Xerox Corporation, Norwalk, CT (US)

(72) Inventors: David A. Mantell, Rochester, NY (US); Chu-Heng Liu, Penfield, NY (US); Seemit Praharaj, Webster, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/018,404

(22) Filed: Jun. 26, 2018

(51) Int. Cl.
*B41J 2/21* (2006.01)
*B41J 2/045* (2006.01)
*B41J 11/00* (2006.01)
*B41J 2/14* (2006.01)

(52) U.S. Cl.
CPC .......... *B41J 2/2139* (2013.01); *B41J 2/0451* (2013.01); *B41J 2/2142* (2013.01); *B41J 2/2146* (2013.01); *B41J 11/002* (2013.01); *B41J 2/04581* (2013.01); *B41J 2/14233* (2013.01)

(58) Field of Classification Search
CPC ...... B41J 2/2139; B41J 2/2146; B41J 2/2142; B41J 2/0451; B41J 11/002; B41J 2/14233; B41J 2/04581
See application file for complete search history.

(56) References Cited

U.S. PATENT DOCUMENTS

| | | |
|---|---|---|
| 5,764,252 A | 6/1998 | Burr et al. |
| 6,354,693 B1 | 3/2002 | Looman et al. |
| 6,565,180 B2 | 5/2003 | Yu et al. |
| 7,422,299 B2 | 9/2008 | Mantell et al. |
| 7,422,312 B2 | 9/2008 | Kadomatsu et al. |
| 7,887,154 B2 | 2/2011 | Vladislav |
| 7,997,712 B2 | 8/2011 | Banning |
| 8,042,899 B2 | 10/2011 | Folkins et al. |
| 8,531,743 B2 | 9/2013 | Wu et al. |
| 8,540,330 B2 | 9/2013 | Ramakrishnan et al. |
| 8,678,533 B2 | 3/2014 | Mantell |
| 9,010,893 B1 * | 4/2015 | Mizes ................... B41J 29/393 347/10 |
| 9,016,816 B2 | 4/2015 | Terayama et al. |
| 2008/0123146 A1 | 5/2008 | Ike et al. |
| 2009/0315939 A1 | 12/2009 | Mantell et al. |
| 2011/0187777 A1 | 8/2011 | Shin et al. |

(Continued)

*Primary Examiner* — Sharon A. Polk
(74) *Attorney, Agent, or Firm* — Maginot Moore & Beck LLP (57) ABSTRACT

A method of operating an inkjet printer that forms textual data with non-absorbing media ink on non-absorbing media forms the characters with structure that improves the integrity of the edges of the characters over previously known systems. The method includes modifying character pixels in image data used to generate firing signals for operating inkjets in a print head of an inkjet imaging device, generating firing signals for operating the inkjets from the modified character pixels, and operating the inkjets in the print head with the generated firing signals to eject drops of non-absorbing media ink onto non-absorbing media to form characters on the non-absorbing media. The character pixel modification reduces a number of character pixels in a connecting zone of a character that have a value that corresponds to a firing signal that activates an inkjet.

20 Claims, 2 Drawing Sheets

(56) References Cited

U.S. PATENT DOCUMENTS

2014/0354723 A1    12/2014   Kroon
2015/0055184 A1*   2/2015   Lin ........................ H04N 1/405
                                                                                        358/3.06

* cited by examiner

SYSTEM AND METHOD FOR IMPROVING CHARACTER EDGE FORMATION ON NON-ABSORBING MEDIA

TECHNICAL FIELD

This disclosure relates generally to inkjet printing of characters on media, and, more particularly, to inkjet printing of characters on non-absorbing media with improved edge integrity.

BACKGROUND

Inkjet printers have print heads that operate a plurality of inkjets in each print head to eject drops of liquid ink. The liquid ink may be stored in reservoirs located in the printer, or the ink may be provided in a solid form and then melted to produce liquid ink that is supplied to the reservoirs for printing. A typical inkjet printer has one or more printheads. Each printhead typically contains an array of individual inkjets for ejecting drops of ink across an open gap to an image receiving member to form an image. The image receiving member may be a continuous web of recording media, separate sheets of media carried by a media transport system, or it may be a rotating intermediate imaging member, such as a print drum or belt. In each inkjet of a print head is an individual piezoelectric, thermal, mechanical, or acoustic actuator that generates mechanical forces that eject ink through an orifice, called a nozzle, from an ink filled conduit in response to an electrical voltage signal, sometimes called a firing signal. The amplitude, or voltage level, of the signals affects the amount of ink ejected in each drop. The firing signal is generated by a print head controller in accordance with image data. An inkjet printer forms a printed image in accordance with the image data by printing a pattern of individual ink drops at particular locations on the image receiving member. The locations where the ink drops landed are sometimes called "ink drop locations," "ink drop positions," or "pixels." Thus, a printing operation can be viewed as the placement of ink drops on an image receiving member in accordance with image data.

Typically, inkjet printing does not print coverage areas as full solids so the blank pixels can be used by image processing to correct for variability in the output of the print head, such as drop variations between inkjets and weak or missing inkjets. Some types of blank pixels within characters, however, can be problematic. As used in this document, "character" means a non-graphical symbol that represents a textual element. For one, the absence of printed pixels at character edges can be visible as ragged edges. Additional issues include color registration problems between color separations and holes inside text characters. One way to address this issue is to print the text characters as solid fill.

Printing text characters with solid fill on uncoated media is effective to address these issues but printing solid fill characters on non-absorbing media presents additional problems. Non-absorbing media, especially regular coated media that are not specifically formulated for inkjet printing, typically absorb ink at a much slower rate or do not absorb ink at all. Such media include plastic sheets and flexible films. Due to the non-absorbing or slow absorbing nature of the substrates, the printed ink stays on the top surface as a highly mobile fluid, which presents various challenges to the quality of the printed images. As used in this document, the term "non-absorbing media" means media that does not absorb or slowly absorbs ink. Such non-absorbing media includes, for example, plastics, film media, and coated media. As used in this document, the term "coated media" means substrates that have been pretreated. Pretreatments include the application of a compound that prevents the absorption of liquid inks, such as the majority of compounds used to produce offset coated media. Pretreatments also include compounds that separate colorant in the ink from solvent in the ink and supports most of the colorant on the surface of the substrate. Pretreatments can absorb ink for media that is non-absorbent or, alternatively, reduce the absorption of ink by absorbent media. Pretreatments can also tailor the wetting characteristics of the ink to the media.

Some additional problems result from new inks that have been formulated for use with non-absorbing media. These new inks typically spread really well over the surface of the non-absorbing media. Before these inks are immobilized through drying, they remain on the surface of the non-absorbing media as low viscosity liquids and can puddle, spread, flow, and coalesce, which can cause print defects. The defects are especially present when the ink amount is high or when the gradient of the ink amount is high along edges. Because these inks formulated for printing non-absorbing media tend to sit on top of the non-absorbing media, far less ink is needed for area coverage than is required for printing more absorbent media. Depending on the media, the amount of ink needed for an area might be as low as 35% of the pixels within the area. This reduction in the amount of ink needed for area coverage, which is normally a benefit, can present a dilemma when printing text. If these inks are used to print solid fill characters on non-absorbing media area, then too much ink is present on the media surface and image defect issues arise. Because the inks tend to sit on top of the non-absorbing media rather than soak into the media, the puddled ink leaves the printing process vulnerable to ink coalescence effects and defects, such as grain and mottle. The puddled ink can also exacerbate bleeding, where the puddled ink finds an escape route from the printed character and forms channels outside of the character that degrade edges of the text.

Some inkjet systems have addressed the issues presented by these specially formulated inks and non-absorbing media by ejecting an additional clear ink over the media to help stop the spreading of subsequently printed inks. While effective at reducing or eliminating coalescence effects, the clear ink also reduces beneficial spreading of drops within characters and can make other defects, such as streaks, difficult to control. Improving the appearance of text characters printed with non-absorbing media inks on non-absorbing media would be a benefit for inkjet printers.

SUMMARY

A method of printer operation forms text characters with structure that enables the non-absorbing media ink to remain within the boundaries of the character without sacrificing the sparse filling of the character. The method includes modifying character pixels in image data used to generate firing signals for operating inkjets in a print head of an inkjet imaging device, the modification reducing a number of character pixels in a connecting zone of a character that have a value that corresponds to a firing signal that activates an inkjet, generating firing signals for operating the inkjets from the modified character pixels, and operating the inkjets in the print head with the generated firing signals to eject drops of non-absorbing media ink onto non-absorbing media to form characters on the non-absorbing media.

A new inkjet imaging system forms text characters with structure that enables the non-absorbing media ink to remain within the boundaries of the character without sacrificing the sparse filling of the character. The system includes a print head having a plurality of inkjets, each inkjet being configured to eject drops of non-absorbing media ink upon receipt of a firing signal, a memory configured to store image data, and a controller operatively connected to the memory. The controller is configured to modify character pixels in the image data stored in the memory, the modification reducing a number of character pixels in a connecting zone of a character that have a value that corresponds to a firing signal that activates an inkjet, generate firing signals for operating the inkjets from the modified character pixels, and operating the inkjets in the print head with the generated firing signals to eject drops of non-absorbing media ink onto non-absorbing media to form characters on the non-absorbing media.

BRIEF DESCRIPTION OF THE DRAWINGS

The foregoing aspects and other features of a printer and method that forms text characters with structure that enables the non-absorbing media ink to remain within the boundaries of the character without sacrificing the sparse filling of the character are explained in the following description, taken in connection with the accompanying drawings.

DETAILED DESCRIPTION

Figure 1:
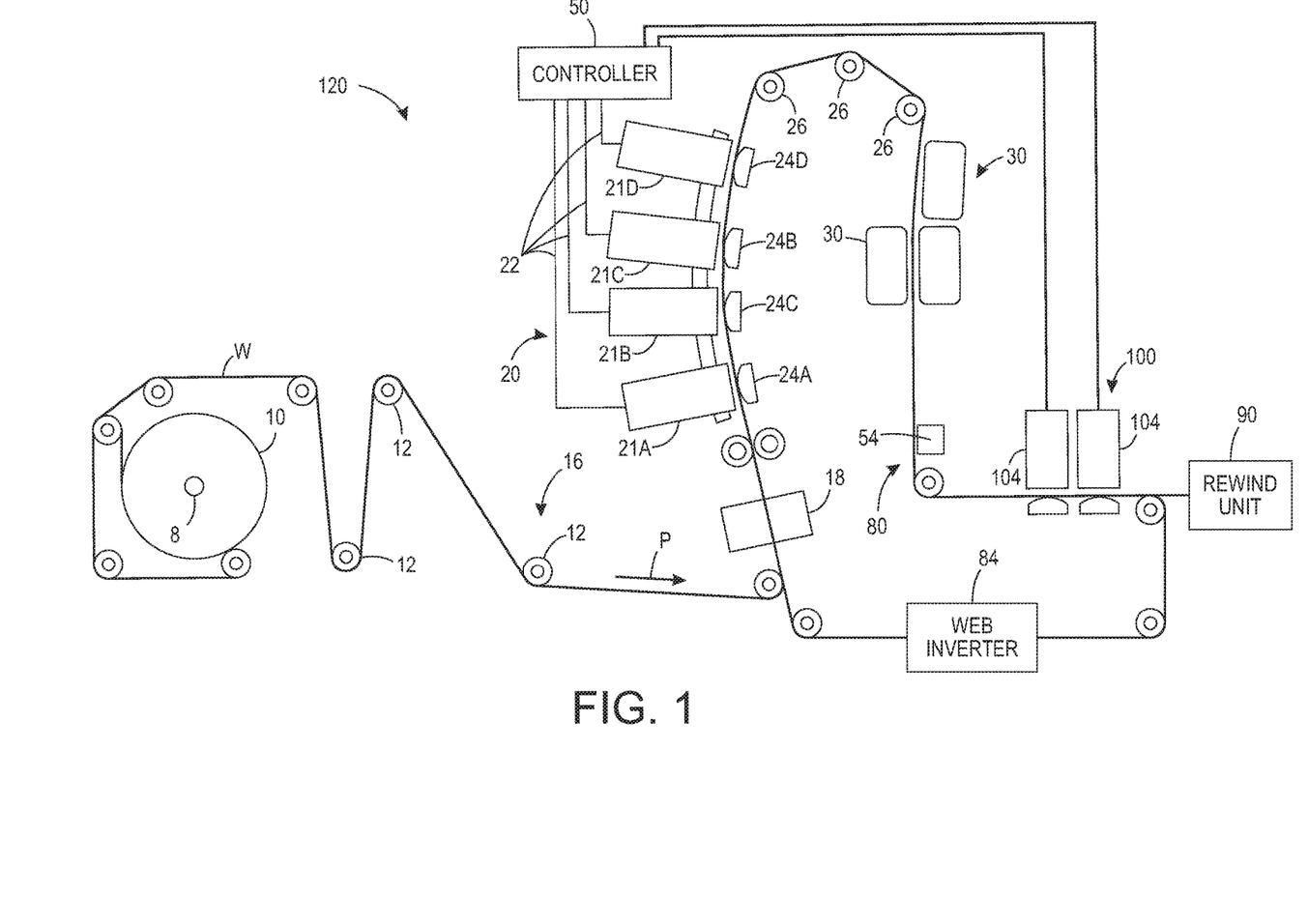
FIG. 1 is a schematic view of an inkjet imaging system that forms characters with non-absorbing media ink on non-absorbing media so the interiors of the characters are sparsely filled and the edges of the characters are solid fill.

Referring to FIG. 1, an inkjet imaging system 120 is shown. For the purposes of this disclosure, the imaging apparatus is in the form of an inkjet printer that employs one or more inkjet printheads and an associated aqueous ink supply. However, the present invention is applicable to any of a variety of other imaging apparatus that use inkjets to eject one or more colorants to a non-absorbing medium or media. The imaging apparatus includes a print engine to process the image data before generating the control signals for the inkjet ejectors. The colorant may be ink, or any suitable substance that includes one or more dyes or pigments and that may be applied to the selected media. The colorant may be black, or any other desired color, and a given imaging apparatus may be capable of applying a plurality of distinct colorants to the media. The media is non-absorbing media that can be available in sheets, rolls, or another physical forms.

FIG. 1 is a simplified schematic view of a direct-to-sheet, continuous-media, inkjet imaging system 120. A media supply and handling system is configured to supply a long (i.e., substantially continuous) web of non-absorbing media W of "substrate" from a non-absorbing media source, such as a spool of non-absorbing media 10 mounted on a web roller 8. For simplex printing, the printer is comprised of feed roller 8, media conditioner 16, printing station 20, printed web conditioner 80, coating station 100, and rewind unit 90. For duplex operations, the web inverter 84 is used to flip the web over to present a second side of the media to the printing station 20, printed web conditioner 80, and coating station 100 before being taken up by the rewind unit 90. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 100 before being flipped by the inverter 84 and laterally displaced by a distance that enables the web to travel over the other half of the rollers opposite the printing station 20, printed web conditioner 80, and coating station 100 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, rotating one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the imaging device. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about room temperature to about 70° C.

The media is transported through a printing station 20 that includes a series of print head modules 21A, 21B, 21C, and 21D, each printhead module effectively extending across the width of the media and being able to place ink directly (i.e., without use of an intermediate or offset member) onto the moving media. As is generally familiar, each of the print heads may eject a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four print heads to compute the position of the web as moves past the print heads. The controller 50 uses these data to generate timing signals for actuating the inkjets in the print heads to enable the four colors to be ejected with a reliable degree of accuracy for registration of the differently color patterns to form four primary-color images on the media. The inkjets actuated by the firing signals correspond to image data processed by the controller 50. The image data may be transmitted to the printer, generated by a scanner (not shown) that is a component of the printer, or otherwise generated and delivered to the printer. In various possible embodiments, a print head module for each primary color may include one or more print heads; multiple print heads in a module may be formed into a single row or multiple row array; print heads of a multiple row array may be staggered; a print head may print more than one color; or the print heads or portions thereof can be mounted movably in a direction transverse to the process direction P, such as for spot-color applications and the like. As used in this document, "process direction" refers to the direction in which the image receiving member is moving as it passes the printhead and the term "cross-process direction" refers to the direction that is perpendicular to the process direction in the plane of the image receiving member.

The aqueous ink utilized in the imaging device of FIG. 1 is non-absorbing media ink. As used in this document, "non-absorbing media ink" means liquid ink having compounds that are separated in the liquid ink but when the ink starts to dry, the compounds crosslink with one another to form a film that sits primarily on the top surface of the non-absorbing media or within the coating on the top of the media. As used herein, liquid ink refers to heated gel ink, aqueous inks, solvent inks, ink emulsions, ink suspensions, ink solutions, or the like.

Associated with each print head module is a backing member 24A-24D, typically in the form of a bar or roll, which is arranged substantially opposite the print head on the back side of the media. Each backing member is used to position the media at a predetermined distance from the print head opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the print heads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the print heads of the printing station 20, the temperature of the media is maintained within a given range. Ink is ejected from the print heads at a temperature equal to or lower than the receiving media temperature. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the print heads of the printing station 20. Temperature sensors (not shown) may be positioned along this portion of the media path to enable regulation of the media temperature. These temperature data may also be used by systems for measuring or inferring (from the image data, for example) how much ink of a given primary color from a print head is being applied to the media at a given time. Following the printing zone 20 along the media path are one or more dryers 30. A dryer 30 may use contact, radiant, conductive, or convective heat to help remove water and other solvents from the ink on the media The coating station 100 can apply a clear coating to the printed media. This clear coating helps protect the printed media from smearing or other environmental degradation following removal from the printer. The overlay of a clear coating can act as a sacrificial layer of ink that may be smeared or offset during handling without affecting the appearance of the image underneath. The coating station 100 may apply the clear ink with a roller or a print head ejecting drops of the clear coating in a pattern. Clear coating for the purposes of this disclosure is functionally defined as a substantially clear overcoat.

Following passage through the coating station 100, the printed media may be wound onto a roller for removal from the system (simplex printing) or directed to the web inverter 84 for inversion and displacement to another section of the rollers for a second pass by the print heads, dryers, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 120 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the difference minimization function, described above. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

The imaging system 120 may also include an optical sensor 54. The drum sensor is configured to detect, for example, the presence, intensity, and/or location of ink drops jetted onto the receiving member by the inkjets of the print head assembly. In one embodiment, the optical sensor includes a light source and a light detector. The light source may be a single light emitting diode (LED) that is coupled to a light pipe that conveys light generated by the LED to one or more openings in the light pipe that direct light towards the image substrate. In one embodiment, three LEDs, one that generates green light, one that generates red light, and one that generates blue light are selectively activated so only one light shines at a time to direct light through the light pipe and be directed towards the image substrate. In another embodiment, the light source is a plurality of LEDs arranged in a linear array. The LEDs in this embodiment direct light towards the image substrate. The light source in this embodiment may include three linear arrays, one for each of the colors red, green, and blue. Alternatively, all of the LEDS may be arranged in a single linear array in a repeating sequence of the three colors. The LEDs of the light source may be coupled to the controller 50 or some other control circuitry to activate the LEDs for image illumination.

The reflected light is measured by the light detector in optical sensor 54. The light sensor, in one embodiment, is a linear array of photosensitive devices, such as charge coupled devices (CODs). The photosensitive devices generate an electrical signal corresponding to the intensity or amount of light received by the photosensitive devices. The linear array that extends substantially across the width of the image receiving member. Alternatively, a shorter linear array may be configured to translate across the image substrate. For example, the linear array may be mounted to a movable carriage that translates across image receiving member. Other devices for moving the light sensor may also be used.

A reflectance may be detected by the light detector in optical sensor 54 that corresponds to each inkjet and each pixel location on the receiving member. The light sensor is configured to generate electrical signals that correspond to the reflected light and these signals are provided to the controller 50. The electrical signals may be used by the controller 50 to determine information pertaining to the ink drops ejected onto the receiving member. Using this information, the controller 50 may make adjustments to the image data to alter the generation of firing signals to either retard or advance the ejection of an ink drop or drops from an inkjet ejector.

The controller 50 of the system 120 is also configured to form sparsely filled text characters with non-absorbing media ink on non-absorbing media with improved edge integrity. This configuration enables the controller 50 to modify the character pixel data in image data used to generate firing signals for operating inkjets in print heads. As used in this document, the term "character pixels" means contone values for pixels that form any portion of a character in printed text. The interior region of the character is formed with pixels having a sparse coverage value and the edge of the character is formed with solid fill pixels. Solid fill pixels have no breaks that can make the edge of a character appear less smooth than the intended font shape. For non-absorbing media, the edge with solid fill may contain an amount of ink that enables the ink to spread and flow beyond the boundary of the text edge. Due to the non-absorbing nature of the substrates, the printed ink stays on the top surface as a highly mobile fluid and the lateral flow of the ink is driven by three mechanisms. One of these mechanisms is spreading, which advances the fluid-substrate contact line by an outward flow of ink on a "dry," that is un-inked area. The more ink delivered to a particular spot, the further and faster the ink spreads. This spreading is a challenge for the solid fill of the character edges. Another mechanism of lateral flow is coalescence, which is the tendency of two or more touching ink drops to flow towards their mutual contact point. The third mechanism is the flow driven by capillary pressure when multiple ink drops connect to form a fluid network or puddle. This flow typically follows the direction from higher ink density to lower ink density.

To address this outward lateral flow introduced by solid fill at character edges, a connecting zone is formed with pixels having a value that is less than sparse coverage value. As used in this document, the term "connecting zone" means pixels not forming a boundary of a character that are adjacent a pixel in the interior region of the character, adjacent a pixel that forms a portion of the edge of the character, or adjacent to both a pixel in the interior region and a pixel at the edge of the character. "Adjacent" as used in the definition of connecting zone includes diagonally adjacent pixels and diagonal pixels. As used in this document, the term "edge of a character" or "character edge" means those pixels that form the boundary of a character and the term "interior region" means those pixels within a perimeter formed by the connecting zone pixels. The pixel structure within the connecting zone establishes a fluid network connecting the solid edge where a higher ink amount occurs and the less populated interior where a lower ink amount occurs. This differential helps wick ink from the solid fill edge pixels towards the interior region of the character. Because fluid wicking action is typically much faster than spreading, this wicking helps quickly reduce the ink height at the character edge and helps prevent the solid fill ink from spreading beyond the boundary of the character, thus preserving the edge of the character, and aids in boosting the coverage within the sparsely filled character body. As noted above, the coverage of a printed area on non-absorbent media can be as low as 35% area coverage. Thus, the connecting zone coverage is less than the area coverage used for the interior region of a character to help ensure the connecting zone pixels wick ink from the solid edge to the character interior region. In one embodiment, this coverage is about 25% of the minimum sparse area coverage of 35%, that is, about 9% area coverage in the connecting zone. Variations of this character forming method are discussed below.

One variation of the above-described method involves a modification of the half-tone scheme used to set the pixel values in the image data used to operate the inkjets. Prior to halftone processing, the contone values for textual character edge pixels are set to a solid fill value to form a solid character boundary. In most embodiments, the solid fill value is the full grayscale value for the printer, which is typically 255. The interior region of the character, which is at least one or two pixels from the edge, are set to a sparse fill interior region contone value. In one embodiment, this value is in the range of about 44% to about 50% of the solid fill value. A grayscale value of around 120 is typical for the interior region of characters formed on non-absorbing media. The contone value used for the pixels in the connecting zone is 30, which is 25% of the interior contone value of 120. After this process is performed for each textual character, the modified text image data is halftoned by a known method. One such known halftoning method uses a blue noise screen. This method, however, may produce clumps and gaps in the connecting zone since that area is relatively thin, that is, one or two pixels wide. Therefore, other halftoning methods may produce less clumps and gaps in the connecting zone pixels.

Another variation operates with the setting of the contone values for the interior region and the edge pixels being as described before halftoning the image data. Approximately, nine percent of the pixels in the connecting zone are randomly set to a value that is about twenty-five percent of the contone value used for the character interior. This approach produces fewer clumps and gaps than the halftoning method used for setting connecting zone pixels.

The choice of connecting zone pixels can be based on a distance metric from previous pixels located in the connecting zone. In this approach, the connecting region is essentially a one pixel wide path from one of the edge pixels. After an edge pixel is chosen for the path, the distance along the path of the connecting zone is calculated and at multiples of a predetermined distance, additional pixels are also printed. In one implementation, a single line of distances is stored during scanline processing of images. The distances can be the city-block distances from the last drop printed. As the pixels along the scanline are processed, the distance from any previous drop along that line is incremented until a location is reached that is closer to a pixel from the opposite direction. To mark a drop for printing in the connecting zone, the distance metric to previously processed pixels is updated with the new distance information by reducing the distance values within the scanline by the new distance to the most recently modified pixel. The advantages of a city-block metric as opposed to other distance metrics are: 1) the distance is extremely easy to calculate and 2) the position of previous drops on earlier processed scanlines is not needed since the metric gives the appropriate distance from the single line of distance values. For distance within the connecting zone, this distance metric is used to determine when to place the next drop within the connecting zone. Points within the initial scanline of distances can be filled randomly by calculating the appropriate distances between pixels to fill the scanline. Alternatively, the scanline of distances can be filled with a predetermined pattern of distances. In either implementation, the positions of the initial character edge pixels within the processed image that are part of a connecting path can be distributed to different places around the connecting region rather than all starting at a fixed location at the top of each character. Additionally, to avoid the same artifact within a page, distances typically are incremented only within the boundaries of characters.

A connecting zone can be integrated near a character edge when the document is transformed from a vector description to an image raster. The processor performing the transformation has explicit knowledge of the character edges, which facilitates the near edge modifications needed to implement a character connecting zone. In many architectures, however, the processing for this transformation cannot be easily modified and the insertion of a connecting zone in a character must be done after conversion of the document into the raster state.

Two methods can be used to provide a connecting zone within characters when the document is in raster form. One method operates on the document image when it is in the continuous tone domain and the other operates on the document image when after it is converted to a binary image. In the continuous tone method, the character edges are first identified using edge detection techniques, such as a Canny filter. The pixels that are adjacent to the edge but in the interior of the character are modified by reducing their apparent darkness. In CMYK images, for example, the continuous tone values are reduced to values that result in less ink. These pixels become the connecting zone pixels. The connecting zone pixel gray values must not, however, be reduced to zero, since zero values do not allow ink flow between the character edge pixels and the interior region pixels. Instead, the connecting zone pixels are reduced to grayscale values that support the amount of connectivity needed for optimal ink flow between the character edge and the character interior region. If, for example, continuity of the character exterior to the interior is selected to be about ten percent along the circumference of the character, then the grayscale level of the connecting zone pixels is set to a value that results in ten percent inkjet firing in that region after the character is subjected to halftone processing. In the case of a linear halftone where the area coverage is proportional to the grayscale values, the grayscale values of the pixels in the connecting zone are set equal to the desired connectivity percentage. To optionally preserve local darkness, the grayscale values of the neighboring pixels of the connecting zone pixels can be augmented to offset the loss of ink inherent in employing a connecting zone. In the case of linear halftone processing, the amount of augmentation of the connecting zone neighboring pixels is equal to the decrease in the connecting zone pixels from their original values.

In the second approach, morphological pixel mapping can be used to form connecting zones within characters after the document image has been converted to binary form. In this type of processing, the connecting zone pixels are tagged as was done in the continuous tone image connecting zone formation described above. Subsequently, character pixels that are tagged as being within a connecting zone and as being active, that is, corresponding to a location where an inkjet fires to eject an ink drop with certain a priori probabilities, are moved to either a character edge or to a character interior. As an example, all pixels corresponding to inkjet firings within a connecting zone are moved with a forty percent probability to the exterior of the character, with a forty percent probability to the interior of the character, and with a twenty percent probability of being left alone. Collision logic can used to account for times where the location to which the pixel is to be moved is already active. Simple collision logic can include choosing an alternate location for relocation of the pixel, such as moving the pixel to the interior region if the edge pixel is already active, vice versa, or increasing the probabilities of moving subsequent connecting zone pixels until the desired a priori ratio of pixel relocation is achieved.

Figure 2:
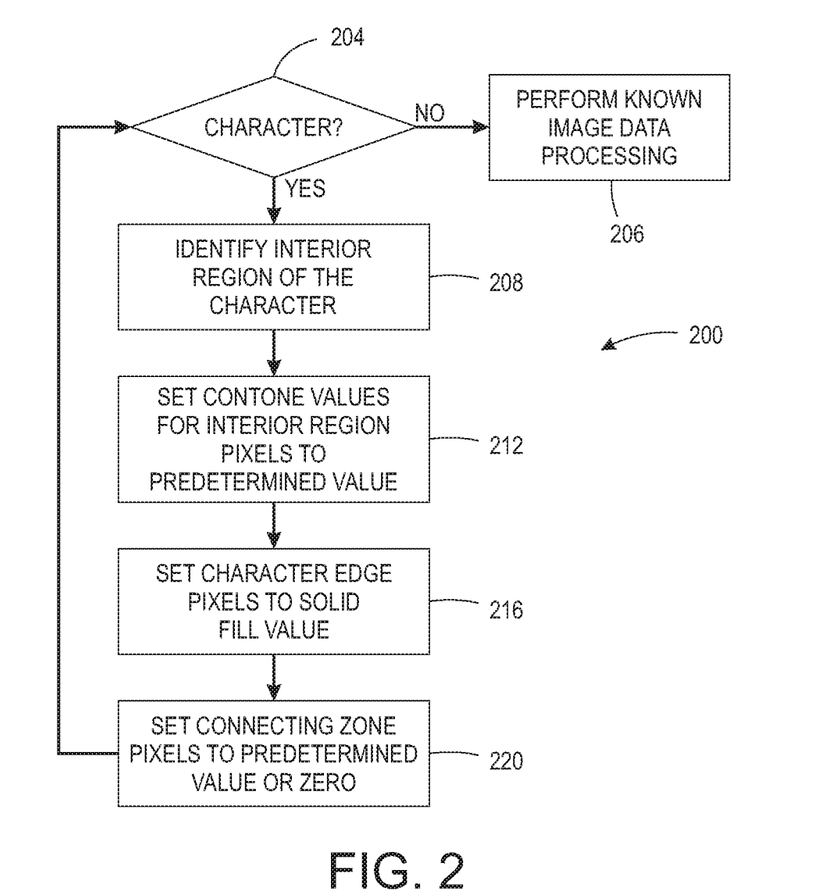
FIG. 2 is a flow diagram of a process for modifying character pixels to enable characters to be formed with non-absorbing media ink on non-absorbing media so the interiors of the characters are sparsely filled and the edges of the characters are solid fill.

A process for the controller 50 operating the system 120 to form characters on non-absorbing media with non-absorbing media inks is shown in FIG. 2. In the description of the process, statements that the process is performing some task or function refers to a controller or general-purpose processor executing programmed instructions stored in non-transitory computer readable storage media operatively connected to the controller or processor to manipulate data or to operate one or more components in the printer to perform the task or function. The controller 120 noted above can be such a controller or processor. Alternatively, the controller can be implemented with more than one processor and associated circuitry and components, each of which is configured to form one or more tasks or functions described herein. Additionally, the steps of the process may be performed in any feasible chronological order, regardless of the order shown in the figures or the order in which the processing is described.

The process 200 begins with detecting a character within image data used to operate the inkjets in the print heads (block 204). If not, previously known processing of the image data is performed (block 206). If a character is detected, the interior region of the character is identified (block 208) and the contone values for the pixels in the interior region are set to a predetermined interior region contone value (block 212). The definition of interior region presented above means that in one embodiment of the process, the interior region includes all of the pixels within the character except those pixels that touch an edge pixel, while in another embodiment of the process, the interior region includes all of the pixels within the character except those pixels that touch an edge pixel and those pixels that touch a pixel that touches an edge pixel. The edge pixels are then set to a solid fill contone value (block 216). The remaining pixels are connecting zone pixels are they are processed to identify those pixels that receive connecting zone contone values and the remaining connecting zone pixels are set to zero (block 220). Those connecting zone pixels that receive the connecting zone contone value can be identified with reference to a halftoning process, a random selection process, or a distance metric as noted above. The process then determines whether another character is to be processed, and if so, the process continues (block 204).

In an alternative embodiment the character identification processing of block 204 includes a criterion for the size of the character or the font size. Characters that are too large for effective connecting zone processing can be advantageously treated as other graphic objects because modifications of the edge pixels and connecting zones may be more noticeable in large characters than the modifications are for smaller characters. Likewise, characters may be modified to be larger than a certain size or font because characters that are too small may not have an adequate size for a connecting zone or interior region. Making a solid exterior in these smaller characters may cause too much ink spread from the solid edge pixels of the character without adequate compensation being provided by the connecting zone to the interior region.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of forming sparsely filled characters with non-absorbing media ink on non-absorbing media comprising:
   modifying character pixels in image data used to generate firing signals for operating inkjets in a print head of an inkjet imaging device, the modification reducing a number of character pixels in a connecting zone of a character that have a value that corresponds to a firing signal that activates an inkjet;
   generating firing signals for operating the inkjets from the modified character pixels; and
   operating the inkjets in the print head with the generated firing signals to eject drops of non-absorbing media ink onto non-absorbing media to form characters on the non-absorbing media.

2. The method of claim 1 further comprising:
   setting at least one of the character pixels in an interior region of the character to a sparse fill contone value;
   setting all of the character pixels on an edge of the character to a solid fill value; and
   setting a plurality of the character pixels in the connecting zone to a contone value that is less than the contone value of the character pixels in the interior region.

3. The method of claim 2 further comprising:
   selecting the plurality of character pixels with reference to a halftoning method.

4. The method of claim 2 further comprising:
   selecting the plurality of character pixels with reference to a random selection method.

5. The method of claim 4 wherein the random selection method selects the character pixels in the connecting zone to have a value that is about 25% of a contone value used for pixels in an interior region of the character.

6. The method of claim 2 further comprising:
   selecting the plurality of character pixels in the connecting zone with reference to a distance metric.

7. The method of claim 2 wherein an area coverage of the interior region corresponds to a predetermined sparse area coverage.

8. The method of claim 7 wherein the predetermined sparse area coverage is no less than 35%.

9. The method of claim 2 wherein the contone value for the character pixels in the connecting zone is a predetermined percentage of the sparse fill contone value for the character pixels in the interior region.

10. The method of claim 1 further comprising:
    generating a binary image of the character pixels in the image data;
    identifying character pixels in interior regions of characters in the binary image;
    identifying character pixels forming edges of the characters in the binary image;
    identifying character pixels in the connecting zones in the binary image and as having a value indicative of an inkjet firing;
    moving a first predetermined percentage of character pixels identified in the connecting zones of the binary image and as having the value indicative of inkjet firing to the interior regions of the characters in the binary image;
    moving a second predetermined percentage of character pixels identified in the connecting zones of the binary image and as having the value indicative of inkjet firing to the edges of the characters in the binary image; and
    leaving a third predetermined percentage of character pixels identified in the connecting zones of the binary image and as having the value indicative of inkjet firing in the connecting zones of the characters in the binary image.

11. The system of claim 1, the controller being further configured to:
    generate a binary image of the character pixels in the image data;
    identify character pixels in interior regions of characters in the binary image;
    identify character pixels forming edges of the characters in the binary image;
    identify character pixels in the connecting zones in the binary image and as having a value indicative of an inkjet firing;
    move a first predetermined percentage of character pixels identified in the connecting zones of the binary image and as having the value indicative of inkjet firing to the interior regions of the characters in the binary image;
    move a second predetermined percentage of character pixels identified in the connecting zones of the binary image and as having the value indicative of inkjet firing to the edges of the characters in the binary image; and
    leave a third predetermined percentage of character pixels identified in the connecting zones of the binary image and as having the value indicative of inkjet firing in the connecting zones of the characters in the binary image.

12. An inkjet printing system comprising:
    a print head having a plurality of inkjets, each inkjet being configured to eject drops of non-absorbing media ink upon receipt of a firing signal;
    a memory configured to store image data;
    a controller operatively connected to the memory, the controller being configured to:
       modify character pixels in the image data stored in the memory, the modification reducing a number of character pixels in a connecting zone of a character that have a value that corresponds to a firing signal that activates an inkjet;
       generate firing signals for operating the inkjets from the modified character pixels; and
       operating the inkjets in the print head with the generated firing signals to eject drops of non-absorbing media ink onto non-absorbing media to form characters on the non-absorbing media.

13. The system of claim 12, the controller being further configured to:
    set at least one of the character pixels in an interior region of the character to a sparse fill contone value;
    set all of the character pixels on an edge of the character to a solid fill value; and
    set a plurality of the character pixels in the connecting zone to a contone value that is less than the contone value of the character pixels in the interior region.

14. The system of claim 13, the controller being further configured to:
    select the plurality of character pixels with reference to a halftoning method.

15. The system of claim 13, the controller being further configured to:
    select the plurality of character pixels with reference to a random selection method.

16. The system of claim 15 wherein the random selection method selects the character pixels in the connecting zone to have a value that is about 25% of a contone value used for pixels in the interior region of the character.

17. The system of claim 13, the controller being further configured to:
   select the plurality of character pixels with reference to a distance metric.

18. The system of claim 13 wherein an area coverage of the interior region corresponds to a predetermined sparse area coverage.

19. The system of claim 18 wherein the predetermined sparse area coverage is no less than 35%.

20. The system of claim 13 wherein the contone value for the character pixels in the connecting zone is a predetermined percentage of the sparse fill contone value for the character pixels in the interior region.

* * * * *